US011055416B2

(12) United States Patent
Hoole et al.

(10) Patent No.: US 11,055,416 B2
(45) Date of Patent: Jul. 6, 2021

(54) DETECTING VULNERABILITIES IN APPLICATIONS DURING EXECUTION

(71) Applicant: ENTIT Software LLC, Sunnyvale, CA (US)

(72) Inventors: Alexander Michael Hoole, Sunnyvale, CA (US); Ming Sum Sam Ng, Hong Kong (HK)

(73) Assignee: Micro Focus LLC, Santa Clara, CA (US)

( * ) Notice: Subject to any disclaimer, the term of this patent is extended or adjusted under 35 U.S.C. 154(b) by 157 days.

(21) Appl. No.: 15/792,028

(22) Filed: Oct. 24, 2017

(65) Prior Publication Data

US 2019/0121985 A1 Apr. 25, 2019

(51) Int. Cl.

| | |
|---|---|
| ***H04L 29/06*** | (2006.01) |
| ***G06F 21/57*** | (2013.01) |
| ***G06F 11/36*** | (2006.01) |
| ***G06F 21/54*** | (2013.01) |
| ***G06F 21/51*** | (2013.01) |

(52) U.S. Cl.

CPC .......... *G06F 21/577* (2013.01); *G06F 11/362* (2013.01); *G06F 21/51* (2013.01); *G06F 21/54* (2013.01); *G06F 2221/033* (2013.01)

(58) Field of Classification Search

CPC ....... H04L 12/00; G06F 21/577; G06F 21/54; G06F 21/51; G06F 11/362; G06F 9/00

See application file for complete search history.

(56) References Cited

U.S. PATENT DOCUMENTS

| | | | |
|---|---|---|---|
| 6,026,501 A * | 2/2000 | Hohl .................. | G06F 11/3648 714/38.13 |
| 8,407,800 B2 | 3/2013 | Schloegel et al. | |
| 8,726,394 B2 | 5/2014 | Maor et al. | |
| 9,135,405 B2 | 9/2015 | Brumley et al. | |
| 9,514,026 B2 | 12/2016 | Smiljanic et al. | |
| 2010/0281248 A1 | 11/2010 | Lockhart et al. | |

(Continued)

FOREIGN PATENT DOCUMENTS

WO 2017109129 A1 6/2017

OTHER PUBLICATIONS

IOActive Labs Research: "Hacking the Java Debug Wire Protocol—or—"How I met your Java debugger"", Christophe Alladoum published Apr. 23, 2014 accessed Aug. 24, 2017 http://blog.ioactive.com/2014/04/hacking-java-debug-wire-protocol-or-how.html.

(Continued)

*Primary Examiner* — Joseph P Hirl
*Assistant Examiner* — Leynna Truvan

(57) ABSTRACT

In some examples, a method may include detecting a vulnerability in an application during execution on a first computing device. The method may include triggering a breakpoint based on the detecting, thereby pausing the execution of the application before execution of a portion of code that exploits the vulnerability. The method may include communicating a message indicating occurrence of the breakpoint. The method may include receiving a connection request from a second computing device in response to the message. The method may include resuming execution of the application from the breakpoint subject to a signal from the second computing device.

13 Claims, 4 Drawing Sheets

100

COMPUTING DEVICE 110

RUNTIME AGENT 120

APPLICATION 130

```
public ResultSet listTable(String
name) {
  String sql = "SELECT * FROM " +
name;

  ResultSet rs =
statement.execute(sql);

  return rs;
}
```

134

160

NETWORK 150

VULNERABILITY DETECTION AND RESOLVING ENGINE 140

(56) References Cited

U.S. PATENT DOCUMENTS

2012/0151452 A1* 6/2012 Zinkovsky ............ G06F 11/362
717/129
2012/0266248 A1* 10/2012 Amit ....................... G06F 21/52
726/25
2017/0185784 A1 6/2017 Madou et al.

OTHER PUBLICATIONS

APPSEC Application Securikty Labs: "Dynamic Analysis of Android Apps", Erez Metula, OWASP IL Sep. 2, 2014.

* cited by examiner

DETECTING VULNERABILITIES IN APPLICATIONS DURING EXECUTION

BACKGROUND

Security personnel, rather than software developers who author application source code, often conduct vulnerability detection on applications. However, fixing a security vulnerability may be more difficult than detecting the security vulnerability. For example, developers may disagree with such security experts regarding either the reachability or exploitability of a reported vulnerability or defect. Moreover, even though a vulnerability may be detected, it may still be difficult to determine where malicious data comes from, how the program reached the particular vulnerability point, and why pre-installed security controls, if any, failed to detect the particular vulnerability in time to avoid falling victim.

BRIEF DESCRIPTION OF THE DRAWINGS

Some implementations of the present disclosure are described with respect to the following figures.

Figure 1:
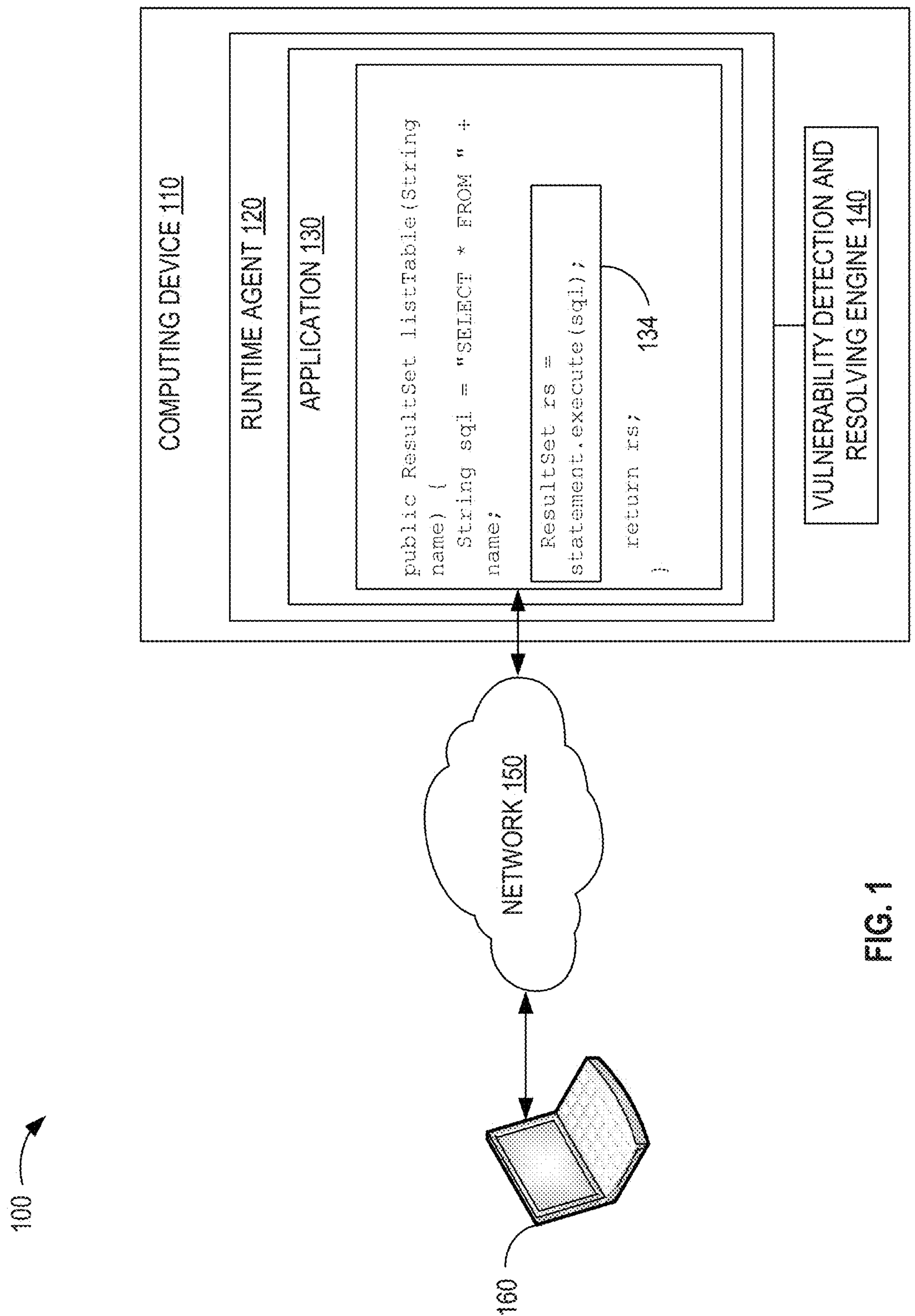
FIG. 1 is a block diagram of an arrangement for detecting vulnerabilities in applications during execution, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples consistent with the description; however, the description is not limited to the examples provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Security personnel, rather than software developers who author application source code, often conduct vulnerability detection on applications. A vulnerability may be considered any code that, when executed by a computing device, causes an unintended operation by that or another computing device. Developers may disagree with such security personnel regarding many security aspects including, for example, the accessibility or exploitability of a reported vulnerability or defect. For example, developers may not agree that a particular identified portion of code is accessible or exploitable and, therefore, is not an actual vulnerability or defect. Such disagreement may decrease the likelihood that a developer will properly debug the disputed portion of code identified by security personnel. By pausing or halting execution of an application during runtime, immediately before execution of a portion of code configured to exploit the vulnerability, and allowing developers to remotely debug the application at the precise location of halted execution, developers, who may possess more skilled knowledge of the application, may be provided information and context that makes it easier to acknowledge and fix such vulnerabilities. Accordingly, such a developer-friendly mechanism may make it much easier for developers to understand what is happening within the software as it executes and how to resolve any issues, e.g., during staging and testing. Such a developer-friendly mechanism also enables communication between security personnel and developers based on the actual context of the operating application because the developer may directly observe the state of the software under attack. In addition, such mechanisms may help developers detect and debug more general program reliability bugs, such as race conditions, where multiple entities or program threads compete for a limited resource such as memory. Moreover, the paused execution environment may provide convincing evidence of the validity and seriousness of the vulnerability and may urge developers to take immediate rectifying action.

As described herein, breakpoint support in runtime monitoring solutions allow for executing a breakpoint at the precise code location that an exploitation of the vulnerability occurs during execution, which may cause a transfer of control of the application to a monitoring debugger. Such examples may allow developers to confirm and fix security vulnerabilities faster because they are provided information regarding the context of the application at the precise moment that a vulnerability will be exploited, which may further reduce costs of such remediation.

FIG. 1 is a block diagram of an arrangement 100 for detecting vulnerabilities in applications during execution. Arrangement 100 includes a first computing device 110, having a runtime agent 120 and a vulnerability detection and resolving engine 140, and a second computing device 160 in communication with first computing device 110 over a network 150, according to some examples.

Computing device 110 may include runtime agent 120, for example, a runtime platform, though any known or yet unknown runtime platform is also contemplated. In some examples, computing device 110 may be a webserver. Runtime agent 120 may control, and execute, code 132 of an application, for example application 130. Computing device 110 may include vulnerability detection and resolving engine 140, which may detect a vulnerability in application 130 during execution on computing device 110, trigger a breakpoint based on detecting the vulnerability, thereby pausing execution of application 130 before execution of a portion of code 134 that may exploit the vulnerability, and maintain paused execution of application 130 until receipt of a signal from computing device 160.

As used here, an "engine" may refer to a software component and/or a hardware processing circuit, which may include but is not limited to any or some combination of the following: a microprocessor, a core of a multi-core microprocessor, a microcontroller, a programmable gate array, a programmable integrated circuit device, or any other hardware processing circuit.

Network 150 may include a wired network, a wireless network, or a combination of wired and wireless networks. Moreover, in some examples network 150 (or a portion of network 150) may comprise an enterprise network, such as an intranet, accessible by users of an enterprise (e.g., a company, a government agency, an educational organization, etc.). In some examples, network 150 (or a portion of network 150) may be a public network, such as the Internet.

Computing device 160 may be an integrated debugger and may receive control of application 130 upon detection of a vulnerability in application 130 by vulnerability detection and resolving engine 140 during execution on computing device 110. Computing device 160 may display contextual information for application 130, for example, stack traces and register and variable values. Computing device 160 may provide code debugging functionality to a user, e.g., a developer. One example of such code debugging functionality may include code inspection. Another example of such code debugging functionality may include the ability to step through execution of code of application 130. Yet another example of such code debugging functionality may include the ability to receive from the developer and provide to computing device 110, one or more modifications to application 130. Such modifications may include at least one of: fixing the vulnerability, or removing the vulnerability from application 130.

Computing device 160 may include any or some combination of the following: a desktop computer, a notebook computer, a tablet computer, a smartphone, a server computer, or any other device capable of communicating over network 150. Although one computing device 160 is shown, the present disclosure contemplates any number of such devices, which may communicate with computing device 110 via network 150.

For some examples described herein, application 130 may be executed with debugger enabled. For example, in Java, the user may provide the following JVM options to enable remote debugging: -Xdebug Xrunjdwp:transport=dt_socket, address=8001, server=y suspend=n. For some examples described herein, where application 130 comprises an IIS .NET application, a remote debugger may be installed on computing device 110.

Functionality of computing device 110 and computing device 160 of FIG. 1 may be described in more detail in connection with the following figures.

Figure 2:
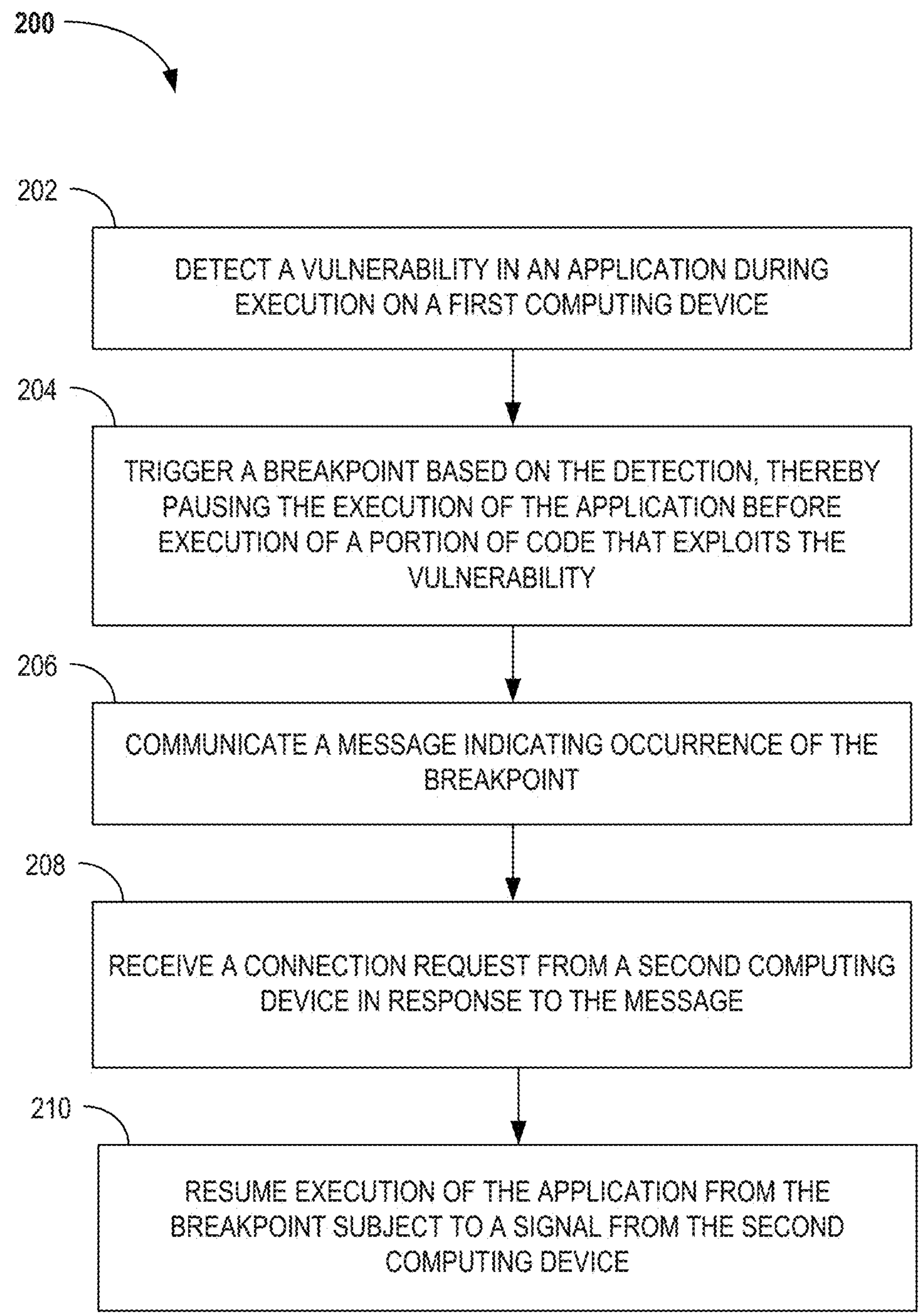
FIG. 2 is a flow diagram for detecting vulnerabilities in applications during execution, according to some examples.

FIG. 2 is a flow diagram 200 for detecting vulnerabilities in applications during execution, according to some examples. Flow diagram 200 may be carried out, for example, by vulnerability detection and resolving engine 140 of FIG. 1. It should be understood that not all blocks of flow diagram 200 may be carried out and, in some examples, one or more actions not described in connection with flow diagram 200 may be carried out.

At block 202, computing device 110 may detect a vulnerability in an application during execution on a computing device. For example, vulnerability detection and resolving engine 140 of computing device 110 may detect a vulnerability in application 130 during execution on runtime platform 120 of computing device 110. In some examples, detecting the vulnerability comprises determining that the vulnerability matches predefined conditions, for example, including a predefined arrangement of code, or having the capability to perform any of a predetermined listing of undesired functions, e.g., SQL injection.

At block 204, computing device 110 may trigger a breakpoint based on the detection, thereby pausing the execution of the application before execution of a portion of code that may exploit the vulnerability. For example, vulnerability detection and resolving engine 140 may trigger a breakpoint based on detecting a vulnerability matching predefined conditions. Such a breakpoint may be triggered based on invocation of a predefined action, for example a runtime action, e.g., a "Debug" action which may trigger a dummy method such as com.fortify.action.DebugAction( ). In such examples, such a new trigger action function may be defined for runtime agent 120.

At block 206, computing device 110 may communicate a message indicating occurrence of the breakpoint. For example, vulnerability detection and resolving engine 140 may communicate a message indicating occurrence of the breakpoint event to a user, e.g., developer, of computing device 160. Such a message may be communicated to the developer by any means, e.g., text message, instant message, email, phone call, pager alert, notification via an app, etc. Accordingly, in some examples, the message may be communicated from computing device 110 to computing device 160 via network 150. In some other examples, the message may be communicated from computing device 110 to the developer by other means, not necessarily via computing device 160 and/or via network 150.

At block 208, computing device 110 may receive a connection request from a second computing device in response to the message. For example, a developer may initiate a connection request from computing device 160 in response to receiving the notification of the occurrence of the breakpoint.

At block 210, computing device 110 may resume execution of the application from the breakpoint subject to a signal from the second computing device. For example, vulnerability detection and resolving engine 140 may instruct runtime agent 120 to resume execution of application 130 from the breakpoint upon receiving an instruction to remove the triggered breakpoint from application 130 from the developer via computing device 160.

Figure 3:
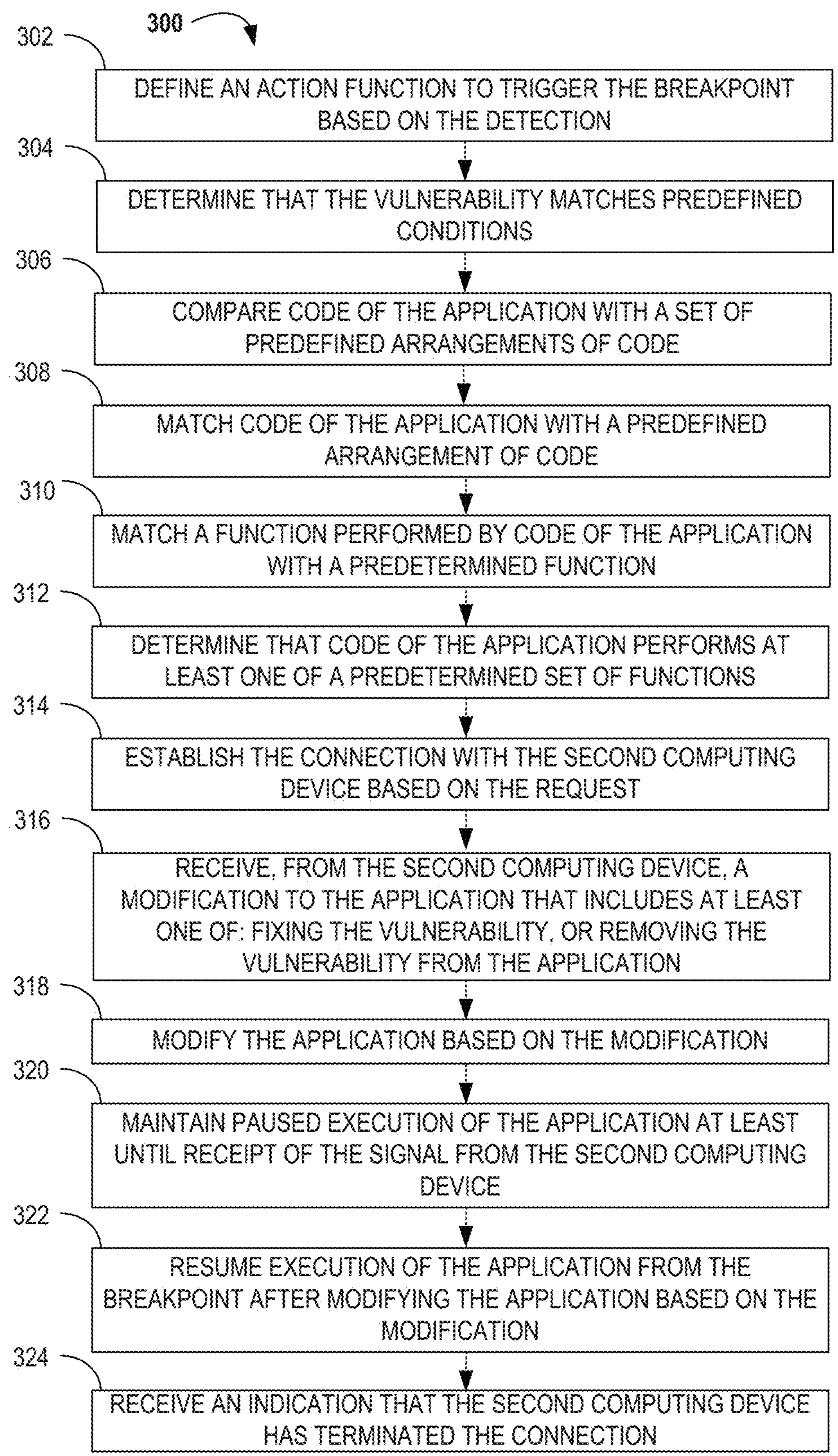
FIG. 3 is another flow diagram for detecting vulnerabilities in applications during execution, according to some examples.

FIG. 3 is another flow diagram 300 for detecting vulnerabilities in applications during execution, according to some examples. Flow diagram 300 may be carried out, for example, by vulnerability detection and resolving engine 140 of computing device 110 shown in FIG. 1. It should be understood that not all blocks of flow diagram 300 may be carried out and, in some examples, one or more actions not described in connection with flow diagram 300 may be carried out.

At block 302, computing device 110 may define an action function to trigger the breakpoint based on the detection. For example, a runtime action, e.g., a "Debug" action which may trigger a dummy method such as com.fortify.action.DebugAction( ), may be defined at a time before block 202 of flow diagram 200 in FIG. 2 is performed. In such examples, such a new trigger action function may be defined, for example, for runtime agent 120.

At block 304, computing device 110 may determine that the vulnerability matches predefined conditions. For example, as previously described in connection with block 204 of flow diagram 200 in FIG. 2, vulnerability detection and resolving engine 140 may trigger a breakpoint based on detecting a vulnerability matching predefined conditions.

At block 306, computing device 110 may compare code of the application with a set of predefined arrangements of code. For example, detecting the vulnerability may include comparing code of application 130 with a set of predefined arrangements of code. In some examples, such predefined arrangements of code may comprise arrangements of code known to cause a particular vulnerability. In some examples, such predefined arrangements of code may have previously been identified as causing a vulnerability in the past.

At block 308, computing device 110 may match code of the application with a predefined arrangement of code. For example, detecting the vulnerability may include matching code of application 130 with a predefined arrangement of code. In some examples, such a predefined arrangement of code may comprise an arrangement of code known to cause a particular vulnerability. In some examples, such a predefined arrangement of code may have previously been identified as causing a vulnerability in the past.

At block 310, computing device 110 may match a function performed by code of the application with a predetermined function. For example, detecting the vulnerability may include matching a function performed by code of application 130 with a predetermined function, e.g., SQL injection.

At block 312, computing device 110 may determine that code of application performs at least one of a predetermined set of functions. For example, detecting the vulnerability may include determining that code of application 130 performs at least one of a predetermined set of functions, e.g., SQL injection.

At block 314, computing device 110 may establish the connection with the second computing device based on the request. For example, after block 208 of flow diagram 200 in FIG. 2, where a connection request is received, computing device 110 may establish the connection with computing device 160, via network 150, based on the request of block 208. Upon establishment of the connection with computing device 160, computing device 160 may have control of execution of application 130 on computing device 110.

At block 316, computing device 110 may receive, from the second computing device, a modification to the application that includes at least one of: fixing the vulnerability, or removing the vulnerability from the application. For example, a developer, using computing device 160, may input a modification for application 130 to computing device 160 based on the specific context and information for application 130 provided at the time the breakpoint was invoked. Computing device 110 may then receive the modification from computing device 160 via network 150.

At block 318, computing device 110 may modify the application based on the modification. For example, vulnerability detection and resolving engine 140 may modify application 130 based on the modification of block 308. In some examples, such modification may result in the vulnerability being at least one of: fixed, or removed from application 130.

At block 320, computing device 110 may maintain paused execution of the application until receipt of the signal from the second computing device. For example, similar to that previously described for block 204 of flow diagram 200 in FIG. 2, vulnerability detection and resolving engine 140 may instruct runtime agent 120 to maintain paused execution of application 130 at the breakpoint, e.g., the portion of code 134 in FIG. 1, until receipt of the signal from computing device 160. In some examples, the signal comprises an instruction to remove the triggered breakpoint from application 130 from the developer via computing device 160.

At block 322, computing device 110 may resume execution of the application from the breakpoint after modifying the application based on the modification. For example, similar to that previously described for block 210 of flow diagram 200 in FIG. 2, vulnerability detection and resolving engine 140 may instruct runtime agent 120 to resume execution of application 130 at the breakpoint, e.g., the portion of code 134 in FIG. 1, after modifying application 130 based on the modification received from computing device 160, e.g., from a developer.

At block 324, computing device 110 may receive an indication that the second computing device has terminated the connection. For example, after debugging the vulnerability in application 130, the developer may cause computing device 160 to terminate the connection between computing device 160 and computing device 110 via network 150. An indication of the connection termination may be received by computing device 110 as generated by computing device 160, network 150 or internally by itself upon determination that the connection is no longer live. In some examples, computing device 110 may wait to resume execution of application 130 until such an indication is received, thereby ensuring control of application 130 execution has been returned from computing device 160 to computing device 110.

Figure 4:
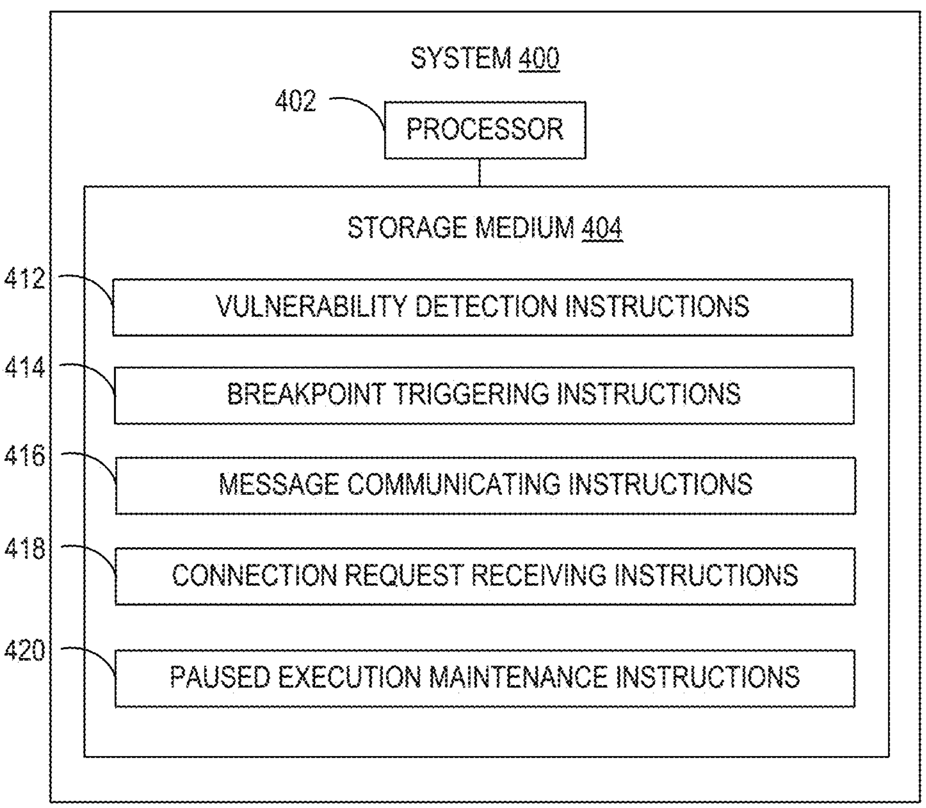
FIG. 4 is a block diagram of a system for detecting vulnerabilities in applications during execution, according to some examples.

FIG. 4 is a block diagram of an example system 400 for detecting vulnerabilities in applications during execution that includes a processor (or multiple processors) 402. System 400 includes a non-transitory machine-readable or computer-readable storage medium 404 storing machine-readable instructions that are executable on the processor 402 to perform various tasks. Machine-readable instructions executable on a processor to perform a task may refer to machine-readable instructions executable on a single processor or on multiple processors to perform the task. A processor may include but is not limited to a microprocessor, a core of a multi-core microprocessor, a microcontroller, a programmable integrated circuit, a programmable gate array, or another hardware processing circuit. In some examples, system 400 may correspond to computing device 110 previously described in connection with FIG. 1.

Storage medium 404 may include vulnerability detecting instructions 412 to detect a vulnerability in an application during execution on a computing device, for example, as previously described in connection with FIG. 2.

Storage medium 404 may include breakpoint triggering instructions 414 to trigger a breakpoint based on the detecting, thereby pausing the execution of the application before execution of a portion of code that may exploit the vulnerability, for example, as previously described in connection with FIG. 2.

Storage medium 404 may include message communicating instructions 414 to communicate a message indicating occurrence of the breakpoint, for example, as previously described in connection with FIG. 2.

Storage medium 404 may include connection request receiving instructions 416 to receive a connection request from computing device 160 in response to the message, for example, as previously described in connection with FIG. 2.

Storage medium 404 may include paused execution maintenance instructions 418 to maintain paused execution of the application until receipt of a signal from computing device 160, for example, similar to that previously described in connection with FIG. 2 and as previously described in connection with FIG. 3.

In some examples, storage medium 404 may include instructions for system 400 to perform any other action described in connection with any of FIGS. 1-3.

Figure 5:
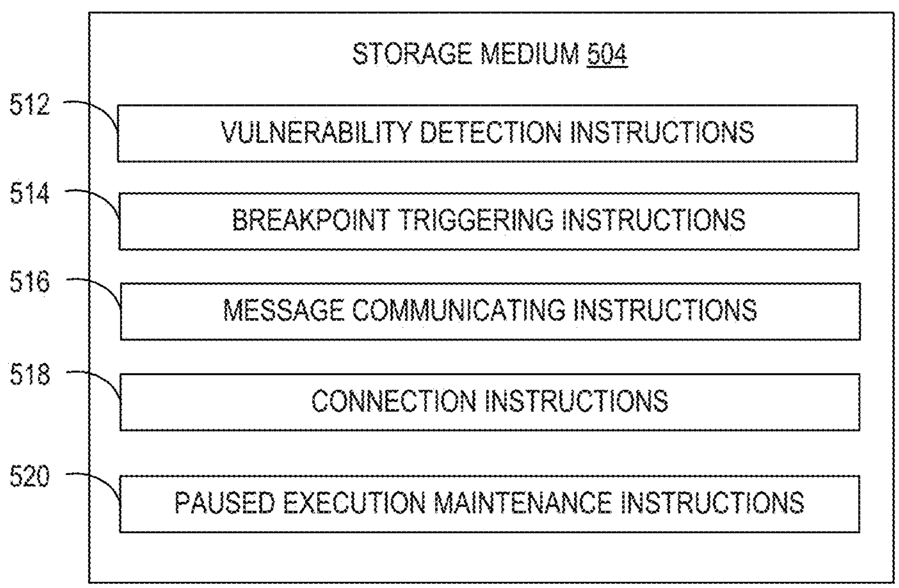
FIG. 5 is a block diagram of a storage medium storing machine-readable instructions for detecting vulnerabilities in applications during execution, according to some examples.

FIG. 5 is a block diagram of a non-transitory machine-readable or computer-readable storage medium 504 that stores machine-readable instructions executable by a system for detecting vulnerabilities in applications during execution. In some examples, storage medium 504 may correspond to storage medium 404 of system 400.

Storage medium 504 may include vulnerability detecting instructions 512 to detect a vulnerability in an application during execution on a computing device, for example, as previously described in connection with FIG. 2.

Storage medium 504 may include breakpoint triggering instructions 514 to trigger a breakpoint based on the detecting, thereby pausing the execution of the application before execution of a portion of code that may exploit the vulnerability, for example, as previously described in connection with FIG. 2.

Storage medium 504 may include message communicating instructions 514 to communicate a message indicating occurrence of the breakpoint, for example, as previously described in connection with FIG. 2.

Storage medium 504 may include connection instructions 516 to connect to computing device 160 in response to the message, for example, as previously described in connection with FIG. 2.

Storage medium 504 may include paused execution maintenance instructions 518 to maintain paused execution of the application until receipt of a signal from computing device 160, for example, similar to that previously described in connection with FIG. 2 and as previously described in connection with FIG. 3.

In some examples, storage medium 504 may further include instructions to perform any other action described in connection with any of FIGS. 1-3.

The storage medium 404 or 504 may include but are not limited to any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In the foregoing description, numerous details are set forth to provide an understanding of the subject disclosed herein. However, examples may be practiced without some of these details. Other examples may include modifications and variations from the details discussed above. It is intended that the appended claims cover such modifications and variations.

What is claimed is:

1. A method comprising:

detecting a vulnerability in an application during execution of the application on a first computing device;

triggering a breakpoint based on the detecting, thereby pausing the execution of the application before execution of a portion of code that exploits the vulnerability;

communicating a message indicating occurrence of the breakpoint;

receiving, by the first computing device from a second computing device over a network, a connection request that is responsive to the message;

in response to the connection request, establishing, by the first computing device, a connection with the second computing device over the network;

receiving, by the first computing device from the second computing device over the network, information representing a modification of the application for addressing the vulnerability;

modifying, by the first computing device, the application based on the information representing the modification; and after the modifying of the application, resuming execution of the application on the first computing device from the breakpoint in response to a signal received by the first computing device over the network from the second computing device, wherein the signal from the second computing device comprises an instruction to remove the breakpoint from the application.

2. The method of claim 1, wherein the information representing the modification of the application received by the first computing device from the second computing device is from a software developer that authored code of the application, and wherein the modifying of the application includes modifying, based on the information representing the modification, the code of the application to fix the vulnerability in the application or remove the vulnerability from the application.

3. The method of claim 1, comprising maintaining the pausing of the execution of the application until receipt of the signal from the second computing device.

4. The method of claim 1, wherein the detecting of the vulnerability comprises one or more of:

determining that the vulnerability matches a predefined condition, comparing code of the application with predefined arrangements of code, and determining that code of the application performs at least one function of a predetermined set of functions.

5. The method of claim 1, wherein the message is communicated from the first computing device to the second computing device over the network.

6. The method of claim 1, wherein after the resuming of the execution of the application from the breakpoint, the execution of the application is controlled by the second computing device.

7. The method of claim 1, comprising:

communicating, by the first computing device to the second computing device over the network, contextual information of the application relating to the vulnerability, wherein the information representing the modification of the application is based on the contextual information.

8. A first computing device comprising:

a processor; and a non-transitory storage medium storing instructions that are executable on the processor to:

detect a vulnerability in a program during execution of the program on the first computing device;

trigger a breakpoint based on the detecting to pause the execution of the program before execution of a portion of code of the program that exploits the vulnerability;

communicate a message indicating occurrence of the breakpoint;

receive, from a second computing device over a network, a connection request that is responsive to the message indicating occurrence of the breakpoint;

in response to the connection request, establish a connection between the first computing device and the second computing device over the network;

maintain the paused execution of the program on the first computing device until receipt by the first computing device of a signal from the second computing device over the network;

receive, from the second computing device over the network, information representing a modification of the program to address the vulnerability;

modify the program based on the information representing the modification; and after modifying the program, resuming execution of the program on the first computing device from the breakpoint in response to a signal received by the first computing device over the network from the second computing device, wherein the signal from the second computing device comprises an instruction to remove the breakpoint from the program.

9. The first computing device of claim 8, wherein the instructions are executable on the processor to communicate the message indicating occurrence of the breakpoint over the network to the second computing device.

10. The first computing device of claim 8, wherein the instructions are executable on the processor to send, to the second computing device over the network, contextual information of the program relating to the vulnerability, wherein the information representing the modification of the application is based on the contextual information.

11. A non-transitory machine-readable storage medium storing instructions that, upon execution, cause a first computing device to:

detect a vulnerability in an application during execution of the application on the first computing device;

trigger a breakpoint based on the detecting, thereby pausing the execution of the application before execution of a portion of code that exploits the vulnerability;

communicate a message indicating occurrence of the breakpoint;

connect to a second computing device over a network in response to the message indicating occurrence of the breakpoint;

maintain the paused execution of the application on the first computing device until receipt of a signal by the first computing device from the second computing device over the network;

receive, from the second computing device, information representing a modification of the application, the information representing the modification of the application being from a human software developer that authored source code of the application;

modify the code of the application based on the information representing the modification; and after modifying the application, resuming execution of the application on the first computing device from the breakpoint in response to a signal received by the first computing device over the network from the second computing device, wherein the signal from the second computing device comprises an instruction to remove the breakpoint from the application.

12. The non-transitory machine-readable storage medium of claim 11, wherein the instructions upon execution cause the first computing device to:

send, to the second computing device over the network, contextual information of the application relating to the vulnerability, wherein the information representing the modification of the application is based on the contextual information.

13. The non-transitory machine-readable storage medium of claim 11, wherein the instructions upon execution cause the first computing device to:

receive, from the second computing device, a connection request that is responsive to the message indicating occurrence of the breakpoint, wherein the connecting by the first computing device to the second computing device over the network is in response to the connection request.

* * * * *